US012656735B2

(12) United States Patent
Kahrobaiyan

(10) Patent No.: US 12,656,735 B2
(45) Date of Patent: Jun. 16, 2026

(54) TIMEPIECE RESONATOR MECHANISM WITH FLEXIBLE GUIDE EQUIPPED WITH MEANS FOR ADJUSTING THE STIFFNESS

(71) Applicant: OMEGA SA, Biel/Bienne (CH)

(72) Inventor: Mohammad Hussein Kahrobaiyan, Neuchatel (CH)

(73) Assignee: OMEGA SA, Biel/Bienne (CH)

(*) Notice: Subject to any disclaimer, the term of this patent is extended or adjusted under 35 U.S.C. 154(b) by 932 days.

(21) Appl. No.: 17/643,278

(22) Filed: Dec. 8, 2021

(65) Prior Publication Data

US 2022/0197218 A1 Jun. 23, 2022

(30) Foreign Application Priority Data

Dec. 18, 2020 (EP) ..................................... 20215523
Nov. 18, 2021 (EP) ..................................... 21208930

(51) Int. Cl.
*G04B 17/04* (2006.01)

(52) U.S. Cl.
CPC .................................. *G04B 17/045* (2013.01)

(58) Field of Classification Search
None
See application file for complete search history.

(56) References Cited

U.S. PATENT DOCUMENTS

2017/0227930 A1* 8/2017 Di Domenico ....... G04B 17/045
2020/0150595 A1* 5/2020 Winkler ............... G04B 17/045

FOREIGN PATENT DOCUMENTS

CH 712 958 A2 3/2018
CN 110780576 A 2/2020
EP 0470018 A1 * 2/1992
EP 3 435 172 A2 1/2019
EP 3 722 888 A1 10/2020

OTHER PUBLICATIONS

Translation of EP0470018, Espacenet (Year: 1992).*
European Search Report for EP 20 21 5523, dated May 19, 2021.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A rotating resonator mechanism (60) including a flexible guide (5) and an oscillating mass (2), the flexible guide (5) including two main flexible strips (4, 6) and a rigid portion (7). The flexible strips are joined to the rigid portion and the oscillating mass. An adjustment means adjusts the stiffness of the resonator mechanism, and includes a flexible element connected to the rigid portion and to a fixed support (11), so that the flexible guide (5) is suspended by the flexible element (12), the flexible guide (5) and the flexible element (12) extending substantially in the same plane so that the oscillating mass (2) performs a rotating movement about a virtual pivot. The adjustment means also includes pre-stressing means (15) to apply a variable force or torque on the flexible element (12) or the flexible guide (5), to vary the stiffness of the flexible element (12).

20 Claims, 4 Drawing Sheets

TIMEPIECE RESONATOR MECHANISM WITH FLEXIBLE GUIDE EQUIPPED WITH MEANS FOR ADJUSTING THE STIFFNESS

CROSS REFERENCE TO RELATED APPLICATIONS

This application claims priority to European Patent Application No. 20215523.0 filed Dec. 18, 2020 and European Patent Application No. 21208930.4 filed Nov. 18, 2021, the entire contents of which are incorporated herein by reference.

TECHNICAL FIELD OF THE INVENTION

The invention relates to a resonator mechanism with flexible guide equipped with means for adjusting the stiffness, particularly for horology.

TECHNOLOGICAL BACKGROUND

Most present-day mechanical watches are equipped with a sprung balance and with a Swiss lever escapement. The sprung balance constitutes the time base of the watch. It is also referred to as the resonator.

The escapement, for its part, performs two key functions:
- sustaining the to-and-fro motions of the resonator;
- counting these to-and-fro motions.

To constitute a mechanical resonator, an inertial element, a guide and an elastic return element are needed. Traditionally, a hairspring plays the role of elastic return element for the inertial element that constitutes a balance. This balance is rotationally guided by pivots, that generally rotate in smooth ruby bearings.

Flexible guides are currently used as springs to form a virtual pivot. The flexible guides with virtual pivot make it possible to substantially improve timepiece resonators. The simplest are crossed-strip pivots, consisting of two guide devices with straight strips that cross, in general perpendicularly. These two strips may be, either three-dimensional in two different planes, or two-dimensional in the same plane and are so then soldered at their crossing point. But uncrossed-strip guides of the RCC (Remote Centre Compliance) type exist, which have straight strips that do not cross.

For its operation, the hairspring balance system must generally be able to be adjusted to improve the precision of a watch. For this purpose, means for adjusting the stiffness of the hairspring are used, such as an index for modifying the effective length of the spring. Thus, its stiffness is modified to adjust the rate precision of the watch. Nevertheless, the effect of a traditional index to adjust the rate remains limited, and it is not always effective for making the adjustment sufficiently precise, in the order of a few seconds or a few tens of seconds per day.

In the case of a flexible guide, adjustment means exist comprising one or more screws arranged in the rim of the balance. By acting on the screws, the inertia of the balance is modified, which has the effect of modifying its rate.

However, although the adjustment range given by these screws is significant, the finesse of the adjustment is not precise. Thus, the adjustment of the rate is difficult to obtain.

SUMMARY OF THE INVENTION

The aim of the present invention is to overcome all or part of the drawbacks mentioned above by proposing a timepiece resonator mechanism with flexible guide equipped with precise adjustment means.

To this end, the invention relates to a rotating resonator mechanism, particularly for horology, the resonator mechanism comprising a flexible guide and an oscillating mass, the flexible guide comprising two flexible strips and a rigid portion, the flexible strips being joined on the one hand to the rigid portion of the flexible guide and on the other hand to the oscillating mass.

The invention is remarkable in that the mechanism comprises means for adjusting the stiffness of the resonator mechanism, the adjustment means comprising a flexible element arranged in series of the flexible guide, the flexible element being connected on the one hand to the rigid portion of the flexible guide and on the other hand to a fixed support, so that the flexible guide is suspended by the flexible element, the flexible element forming a pivot to make it possible for the rigid portion to perform a rotating movement, the flexible guide and the flexible element extending substantially in the same plane to make it possible for the oscillating mass to perform a rotating movement about a virtual pivot, the adjustment means further comprising pre-stressing means to apply a variable force or torque on the flexible element or the flexible guide in such a way as to vary the stiffness of the flexible element.

Thanks to the invention, by acting on the pre-stressing means, the force or the torque applied on the flexible element is modified, which leads to a modification of the stiffness of the assembly comprising the flexible element and the flexible guide. Indeed, the flexible element placed in series with the flexible guide provides an additional stiffness, which adds to that of the flexible guide. Thus, when the pre-stressing means apply a variable force or torque on the flexible element, they modify the stiffness of the flexible element and therefore of the assembly comprising the flexible guide and the flexible element.

In other words, a flexible element is placed in series of the flexible guide, between the flexible guide and the fixed support. This flexible element modifies the stiffness of the attachment point and provides an additional flexibility to the resonator. Thus, the effective stiffness of the resonator comprises the stiffness of the flexible guide and the stiffness of the flexible element. A variable force or torque is then applied to prestress the flexible element without pre-stressing the flexible guide and without moving the flexible guide. By pre-stressing the flexible element, its stiffness changes, whereas the stiffness of the flexible guide remains unchanged, since it is not prestressed and its end does not move. By changing the stiffness of the flexible element, the stiffness of the resonator (stiffness of the flexible guide and stiffness of the flexible element) changes, which consequently modifies the rate of the resonator. The flexible element being, preferably, stiffer than the flexible guide, the proportion of the stiffness of the flexible element in the overall stiffness is less than that of the flexible guide. Consequently, a modification of the stiffness of the flexible element modifies the stiffness of the assembly of the resonator, and consequently finely adjust its rate, which makes it possible to precisely adjust the frequency of our time base. Thus, high precision is obtained in the adjustment of the rate, because only one element is acted on to adjust the stiffness.

According to a particular embodiment of the invention, the pre-stressing means will vary only the stiffness of the flexible element without modifying the stiffness of the main flexible strips.

According to a particular embodiment of the invention, the flexible element comprises at least one secondary flexible strip, preferably two secondary flexible strips, each secondary flexible strip being connected to the fixed support.

According to a particular embodiment of the invention, the pre-stressing means comprise pins in contact with the secondary flexible strips.

According to a particular embodiment of the invention, the pre-stressing means apply the variable force or torque on the secondary flexible strips.

According to a particular embodiment of the invention, the pre-stressing means apply the variable force or torque on the rigid portion of the flexible guide.

According to a particular embodiment of the invention, the pre-stressing means comprise a first moveable body and at least one tertiary flexible strip connected to the first moveable body and to the rigid portion of the flexible guide or to the flexible element.

According to a particular embodiment of the invention, the pre-stressing means comprise a plurality of quaternary flexible strips and a second moveable body, the quaternary flexible strips connecting the second moveable body to the first moveable body.

According to a particular embodiment of the invention, the pre-stressing means comprise at least one quinary flexible strip connecting the second moveable body or the first moveable body to a fixed support.

According to a particular embodiment of the invention, the pre-stressing means include an eccentric screw in contact with the second moveable body or the rigid portion.

According to a particular embodiment of the invention, the pre-stressing means include a screw longitudinally moveable against the second moveable body.

According to a particular embodiment of the invention, the pre-stressing means comprise a lever to move the second moveable body.

According to a particular embodiment of the invention, the pre-stressing means comprise a first magnet integral with the rigid portion or with the second moveable body and a second magnet moveable in relation to the first magnet.

According to a particular embodiment of the invention, the pre-stressing means comprise a spring connected to the rigid portion and a moveable body for stretching or compressing the spring.

According to a particular embodiment of the invention, the pre-stressing means are arranged in the same plane as the flexible guide and the flexible element.

According to a particular embodiment of the invention, the pre-stressing means are arranged in a plane substantially parallel to the plane of the flexible guide and of the flexible element.

According to a particular embodiment of the invention, the flexible element comprises a third moveable body, and a plurality of senary flexible strips connecting the third moveable body to the rigid portion According to a particular embodiment of the invention, the flexible element comprises a fourth moveable body and a plurality of septenary strips connecting the third moveable body to the fourth moveable body.

According to a particular embodiment of the invention, the tertiary flexible strip is connected to the fourth moveable body.

According to a particular embodiment of the invention, the two main strips of the flexible guide are crossed.

According to a particular embodiment of the invention, the flexible element has a stiffness greater than the stiffness of the flexible guide, preferably at least five times greater, or even at least ten times greater.

The invention also relates to a horological movement comprising such a resonator mechanism.

BRIEF DESCRIPTION OF THE FIGURES

The aims, advantages and features of the present invention will become apparent upon reading a plurality of embodiments given only by way of non-limiting examples, with reference to the appended drawings wherein.

DETAILED DESCRIPTION OF THE INVENTION

Figure 1:
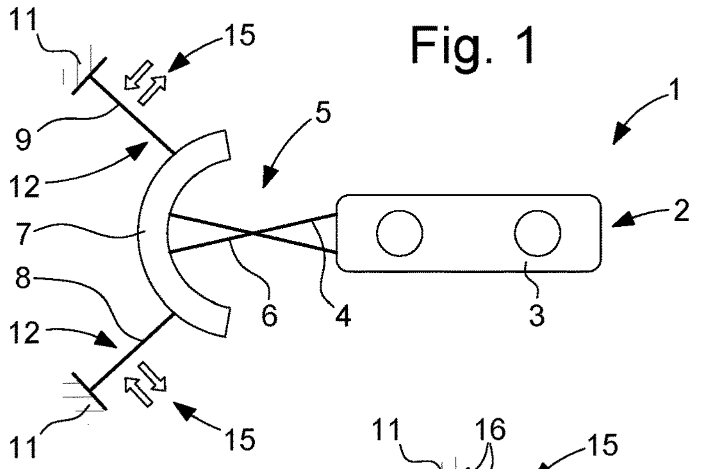
FIG. 1 schematically represents a top view of a resonator mechanism according to a first embodiment of the invention, FIG. 2 schematically represents a top view of a resonator mechanism according to a first variant of the first embodiment of the invention, FIG. 3 schematically represents a top view of a resonator mechanism according to a second embodiment of the invention, FIG. 4 schematically represents a top view of a resonator mechanism according to a first variant of the second embodiment of the invention, FIG. 5 schematically represents a top view of a resonator mechanism according to a second variant of the second embodiment of the invention, FIG. 6 schematically represents a top view of a resonator mechanism according to a third variant of the second embodiment of the invention, FIG. 7 schematically represents a top view of a resonator mechanism according to a fourth variant of the second embodiment of the invention, FIG. 8 schematically represents a top view of a resonator mechanism according to a fifth variant of the second embodiment of the invention, FIG. 9 schematically represents a top view of a resonator mechanism according to a sixth variant of the second embodiment of the invention, FIG. 10 schematically represents a top view of a resonator mechanism according to a seventh variant of the second embodiment of the invention, FIG. 11 schematically represents a top view of a resonator mechanism according to a third embodiment of the invention, FIG. 12 schematically represents a top view of a resonator mechanism according to a first variant of the third embodiment of the invention, FIG. 13 schematically represents a top view of a resonator mechanism according to a second variant of the third embodiment of the invention, FIG. 14 schematically represents a top view of a resonator mechanism according to a third variant of the third embodiment of the invention, and FIG. 15 schematically represents a top view of a resonator mechanism according to a fourth variant of the third embodiment of the invention.

The three embodiments of the resonator mechanism 1, 10, 20, 30, 40, 50, 60, 70, 80, 90, 100, 110, 120, 130, 140, particularly for horology, of FIGS. 1 to 15, comprise a flexible guide 5 and an oscillating mass 2. The oscillating mass 2 comprises an attachment body 3 and a balance (not represented in the figures), for example an annular-shaped balance or a bone-shaped straight member, usually used for horology, which is assembled on the attachment body 3. The attachment body 3 has an elongated rectangular shape. The resonator mechanism 1 extends substantially in the same plane to make it possible for the oscillating mass 2 to perform a rotating movement about a virtual pivot.

The flexible guide 5 comprises two main flexible strips 4, 6 and a rigid portion 7. The flexible guide 5 extends according to a main axis of symmetry. The flexible strips 4, 6 are joined on the one hand to the rigid portion 7 of the flexible guide 5 and on the other hand to the attachment body 3 of the oscillating mass 2. The two main strips 4, 6 of the flexible guide 5 are crossed, preferably straight and of the same length.

According to the invention, the resonator mechanism 1 comprises means for adjusting the stiffness of the resonator mechanism. For this purpose, the adjustment means comprise a flexible element 12 arranged in series of the flexible guide 5, the flexible element 12 being connected on the one hand to the rigid portion 7 of the flexible guide and on the other hand to a fixed support 11, so that the flexible guide 5 is suspended by the flexible element 12, the flexible element 12 forming a pivot to make it possible for the rigid portion 7 to perform a rotating movement. Thus, the rigid portion 7 performs a rotating movement thanks to the flexible element 12. The rotating movement of the rigid portion 7 adds to that of the oscillating mass 2 induced by the flexible guide 5, so that the angular travel of the oscillating mass is increased by the flexible element 12.

Furthermore, the pre-stressing means 15 will vary only the stiffness of the flexible element 12 without modifying the stiffness of the main flexible strips 4, 6. Thus, to adjust the resonator mechanism, only one element is acted on to simplify the adjustment. In addition, the position of the main flexible strips 4, 6, does not change due to the pre-stressing means 15.

In the first two embodiments, the rigid portion 7 has an arc of a circular shape comprising an inner side on which the main strips 4, 6 are joined, preferably symmetrically in relation to the centre of the arc of circle. The flexible element 12 comprises at least one secondary flexible strip, here two secondary flexible strips 8, 9. Preferably, the secondary flexible strips 8, 9 are straight and of the same length. Each secondary flexible strip 8, 9 connects the outer side of the arc of circle of the rigid portion 7 of the flexible guide 5 and the fixed support 11. The secondary flexible strips 8, 9 are preferably arranged close to each end of the arc of circle, symmetrically in relation to the axis of the flexible guide 5.

The adjustment means further comprise pre-stressing means 15 to apply a variable force or torque on the flexible element 12 or the flexible guide 5, in such a way as to vary the stiffness of the flexible element 12.

In the second variant of the first embodiment, the pre-stressing means 15 comprise pins in contact with the secondary flexible strips.

Figure 2:
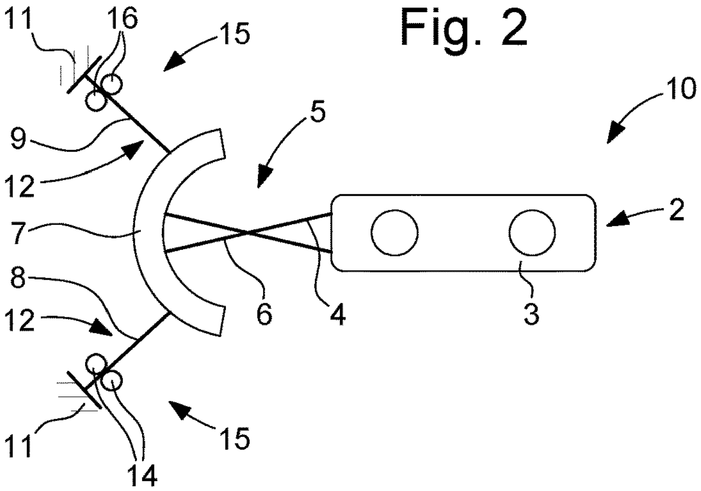

FIGS. 1 and 2 show a schematic representation of the first embodiment of a rotating resonator mechanism 1 for a horological movement. As shown by the operating principle of FIG. 1, the pre-stressing means 15 apply the variable force or torque on the flexible element 12. Here, the pre-stressing means 15 apply the force or the torque on the secondary flexible strips 8, 9. Thus, the stiffness of the secondary flexible strips 8, 9 is modified to adjust the stiffness of the assembly formed of the flexible element 12 and of the flexible guide 5.

In the variant of FIG. 2, the pre-stressing means 15 comprise pins 14, 16, here two pairs of pins each arranged on either side of each secondary flexible strip 8, 9. The two pins 14, 16 are in contact with the secondary flexible strips 8, 9 and may be moved along each strip 8, 9 to modify their stiffness. Thus, the movement of the pins 14, 16 makes it possible to modify the stiffness of the assembly formed by the secondary flexible strips 8, 9 and the flexible guide 5, to adjust the precision of the rate of the resonator mechanism 1.

Figure 3:
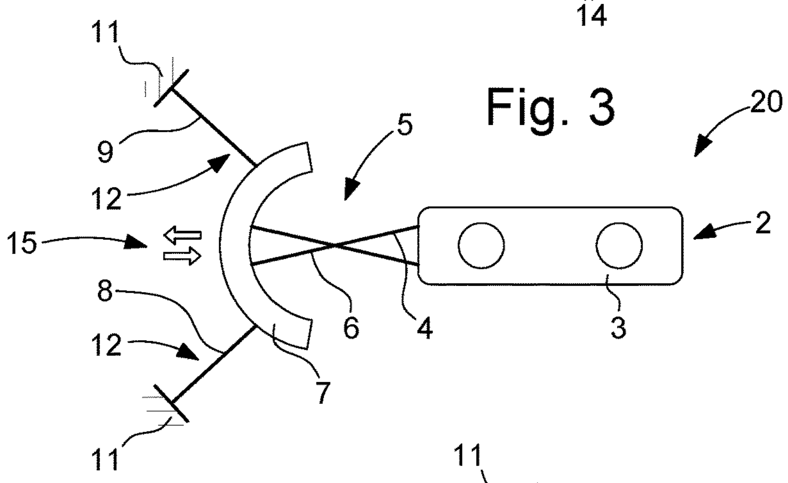

The operating principle of the second embodiment of the resonator mechanism 1 is illustrated in FIG. 3. The pre-stressing means 15 apply the variable force or torque on the flexible guide 5, in particular on the rigid portion 7 of the flexible guide 5. Thus, such an arrangement makes it possible to modify both the stiffness of the main flexible strips 4, 6 of the flexible guide 5 and of the secondary flexible strips 8, 9 of the flexible element 12.

Figure 4:
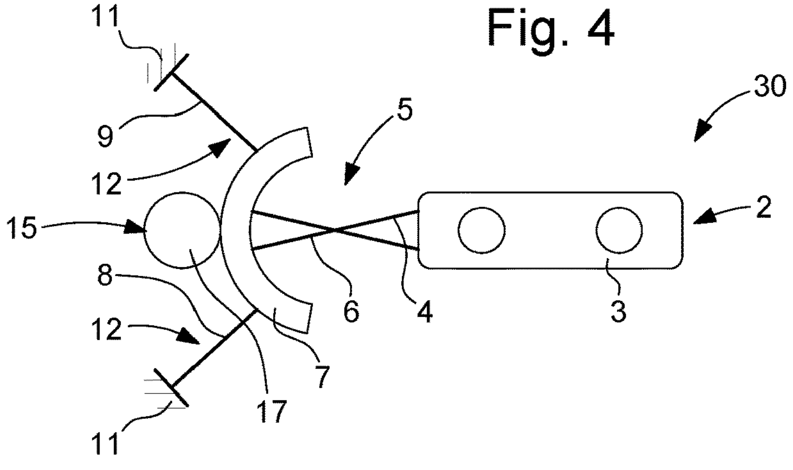
Figure 5:
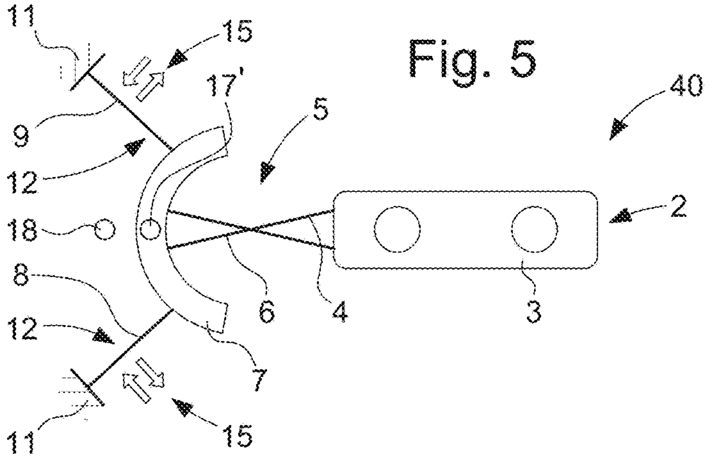

The first variant of the second embodiment of FIG. 4 illustrates pre-stressing means 15 comprising an eccentric screw 17 the head of which is disposed in contact with the rigid portion 7 of the flexible guide 5. Thus, by actuating the eccentric screw 16, the force or the torque applied on the rigid portion 7 is varied.

In the second variant of the second embodiment, the pre-stressing means 15 include magnets 17', 18. A first magnet 17' is arranged on the rigid portion 7 of the flexible guide 5 and a second moveable magnet 18 is arranged at a variable distance from the first magnet 17', so that it applies a variable force or torque on the first magnet 17', and therefore on the rigid portion 7.

Figure 6:
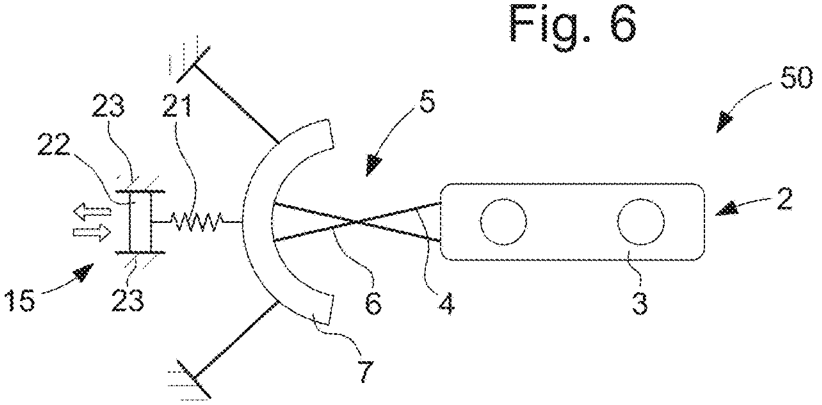

The pre-stressing means 15 of the third variant of FIG. 6 include a spring 21 and a moveable body 22 connected by the spring 21 to the rigid portion 7 of the flexible guide 5. Thus, by moving the moveable body 22, the spring 21 is stretched or compressed to vary the force or the torque exerted on the rigid portion 7.

In the variants of the second embodiment of FIGS. 7 to 10, the pre-stressing means 15 comprise a first moveable body 24 and a tertiary flexible strip 25 assembled in series and to the rigid portion 7 and to the first moveable body 24, preferably according to the axis of symmetry of the flexible guide. The first moveable body 24 has preferably a shape that is elongated and arranged in the axis of the tertiary flexible strip 25.

The pre-stressing means 15 comprise a second elbow-shaped moveable body 27, as well as quaternary flexible strips 26, here four, connecting the two moveable bodies 24, 27. The four quaternary strips 26 are preferably substantially perpendicular to the tertiary strip 25 in rest position of the pre-stressing means 15. The quaternary flexible strips 26 are preferably parallel.

Figure 7:
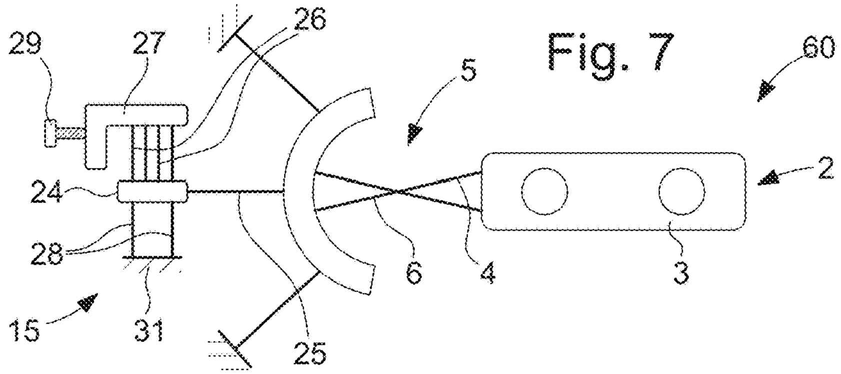

In FIG. 7, the pre-stressing means 15 of the fourth variant of the resonator mechanism 60 further comprise two quinary strips 28 connecting the first moveable body 24 to a fixed support 31. The quinary flexible strips 28 are preferably parallel. The quinary strips 28 are substantially parallel to the quaternary strips 26 and arranged on the opposite side of the first moveable body 24. The pre-stressing means 15 also comprise a screw 29 arranged longitudinally to come into contact with the second moveable body 27 to apply a variable force or torque. By applying a variable force or torque on the second moveable body 27, the stiffness of the resonator mechanism 60 is varied.

Figure 8:
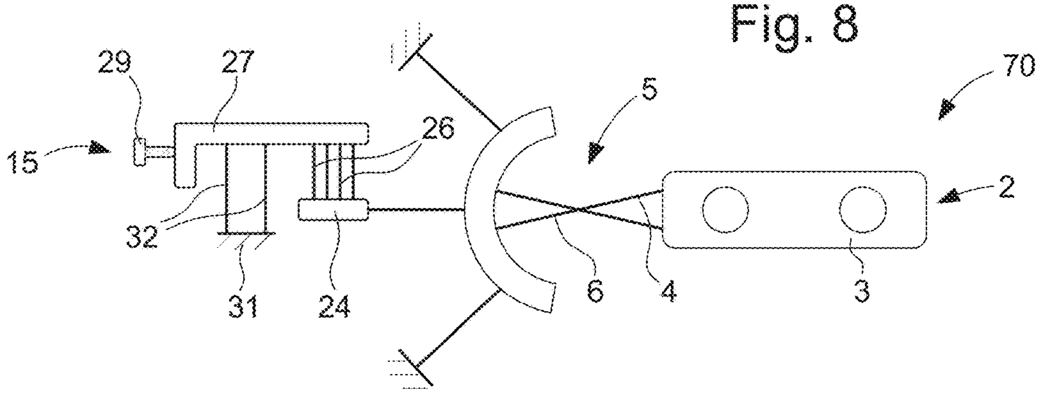

In the fifth variant of the resonator mechanism 70 of FIG. 8, the pre-stressing means 15 further comprise two quinary strips 32 connecting the second moveable body 37 to a fixed support 31. The quinary strips 32 are substantially parallel to the quaternary strips and disposed on the same side of the second element. The pre-stressing means 15 also comprise a screw 29 arranged longitudinally to come into contact with the second moveable body 37 to apply a variable force or torque. By applying a variable force or torque on the second moveable body 37, the stiffness of the resonator mechanism 70 is varied.

Figure 9:
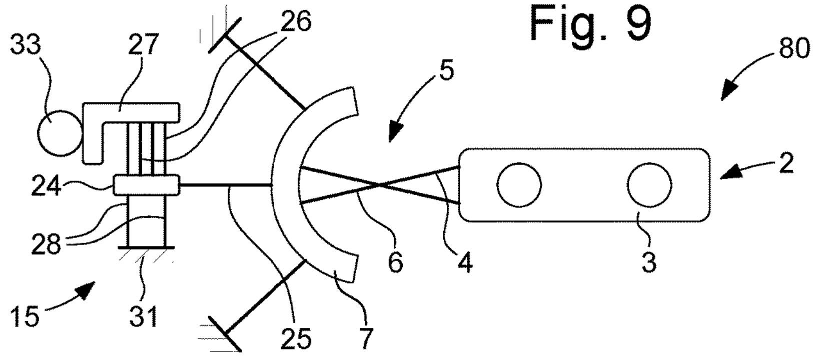
Figure 10:
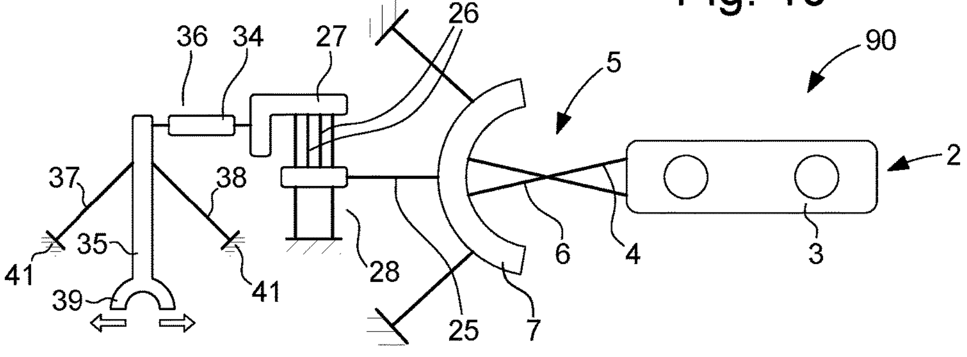
Figure 11:
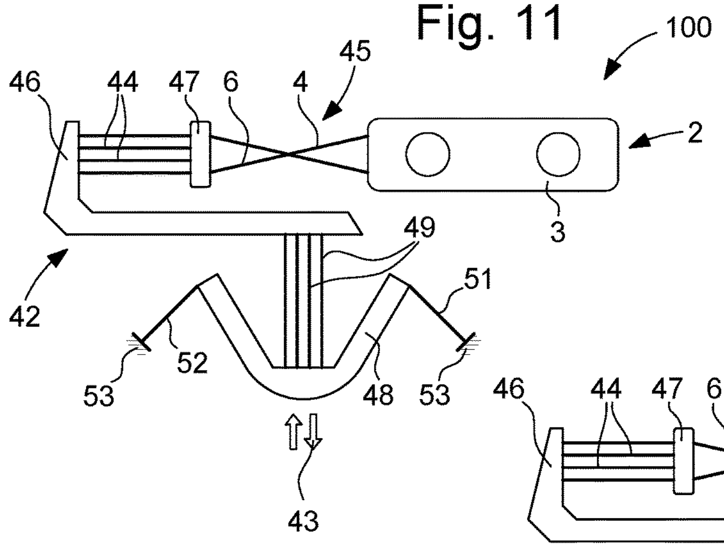

The sixth 80 and seventh 90 variants of resonator mechanism of the second embodiment of FIGS. 9 and 10, are similar to the fourth variant of the second embodiment of FIG. 7 except for the longitudinal screw, which is replaced by another means for applying the force or the torque.

In FIG. 9, the pre-stressing means 15 include an eccentric screw 33 the head of which is in contact with the second moveable body 27. Thus by rotating the screw, the force or the torque applied on the second moveable body 27 is variable.

In the seventh variant of the resonator mechanism 90 of FIG. 10, the pre-stressing means 15 comprise a lever 35 connected to the second moveable body 27 by a senary flexible strip 36 equipped with a rigid central section 34. The senary flexible strip 36 is substantially parallel to the tertiary flexible strip 25 in rest position of the pre-stressing means 15. The lever 35 is arranged perpendicular to the senary flexible strip 36. The lever 35 is further connected to a second fixed support 41 by two septenary strips 37, 38 arranged on either side of the lever 35. The free end 39 of the lever 35 is U-shaped, on which it is possible to act by actuating it laterally, in order to apply a variable force or torque on the flexible element 12.

In the third embodiment of FIGS. 11 to 15, the rigid portion 47 of the flexible guide 45 is elongated and arranged perpendicular to the axis of the flexible guide 45. The flexible element 42 includes at least one senary flexible strip 44, here four senary flexible strips 44, and a third L-shaped moveable body 46. The senary flexible strips 44 are arranged parallel to the axis of the flexible guide 45, and connect the rigid portion 47 of the flexible guide 45 to the inner side of the base of the L. The bar of the L extends parallel to the senary flexible strips 44 in rest position of the flexible element 45. The flexible element 42 further comprises a fourth moveable body 48 and at least one septenary strip 49, here four tertiary flexible strips. The fourth moveable body 48 is wide U-shaped the inside of which is facing the outer side of the bar of the L. The septenary strips 49 connect the outer side of the bar of the L to the inside of the base of the U, and are substantially perpendicular to the senary flexible strips 44.

The flexible element also comprises at least one secondary flexible strip 51, 52, here two secondary flexible strips, connecting the wide ends of the U to a fixed support 53 of the resonator mechanism 100.

The pre-stressing means 43 are configured to apply a force or a torque on the U.

Figure 12:
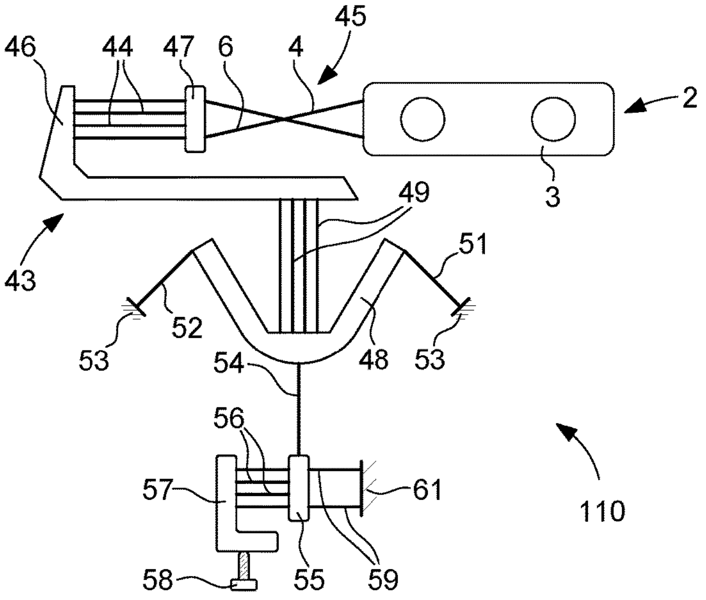

In the first variant of resonator mechanism 110 of the third embodiment of FIG. 12, the pre-stressing means 43 further comprise a first moveable body 55 and a tertiary flexible strip 54 assembled in series and to the rigid portion 47 of the flexible guide 45 and to the first moveable body 55, preferably perpendicular to the axis of symmetry of the flexible guide 45. The first moveable body 55 preferably has a shape that is elongated and arranged in the axis of the tertiary flexible strip 54.

The pre-stressing means 43 comprise a second elbow-shaped moveable body 57, as well as quaternary flexible strips 56 connecting the first 55 and the second moveable body 57. Here, the four quaternary strips 56 are substantially perpendicular to the tertiary strip 54 in rest position of the pre-stressing means 43. The quaternary flexible strips 56 are preferably parallel.

The pre-stressing means 43 also comprise two quinary flexible strips 59 connecting the first moveable body 55 to a fixed support 61. The quinary flexible strips 59 are preferably parallel. The quinary strips 59 are substantially perpendicular to the tertiary flexible strip 54, and are arranged on the side opposite to the quaternary flexible strips 56 in relation to the first moveable body 55. The pre-stressing means 43 also comprise a screw 58 arranged longitudinally to come into contact with the second moveable body 57 to apply a variable force or torque. By applying a variable force or torque on the second moveable body 57, the stiffness of the resonator mechanism 110 is varied.

Figure 13:
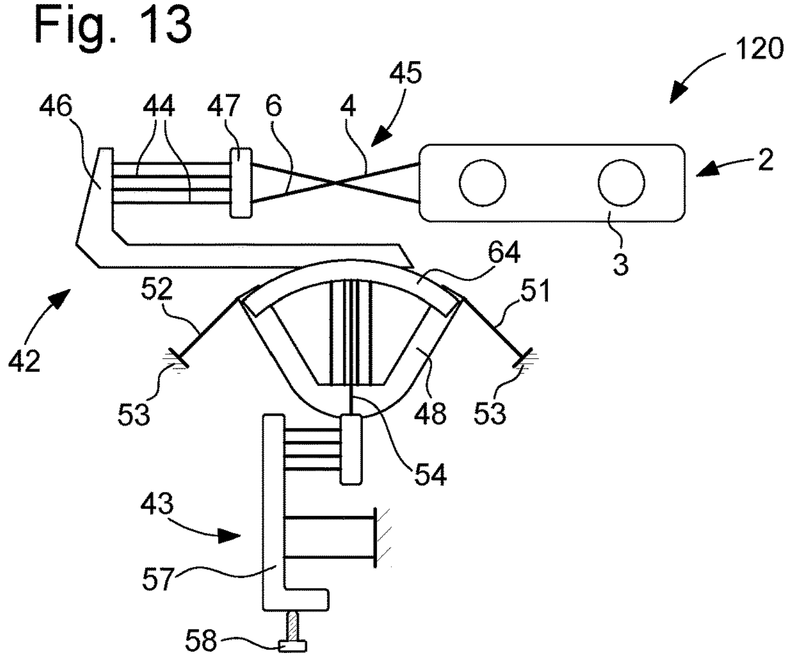

In the second variant of resonator mechanism 120 of the third embodiment of FIG. 13, the pre-stressing means 43 are similar to those of the first variant, but are offset towards the flexible guide 45. The flexible element 42 further comprises an intermediate body 64 on which is joined the tertiary flexible strip 54. The intermediate body 64 is arc of circle-shaped and is assembled at the wide ends of the U of the fourth moveable body 48. The tertiary flexible strip 54 is joined to the inside of the arc of circle. Thus, the pre-stressing means 43 are arranged in a plane substantially parallel to the plane of the flexible guide 45 and of the flexible element 42.

Figure 14:
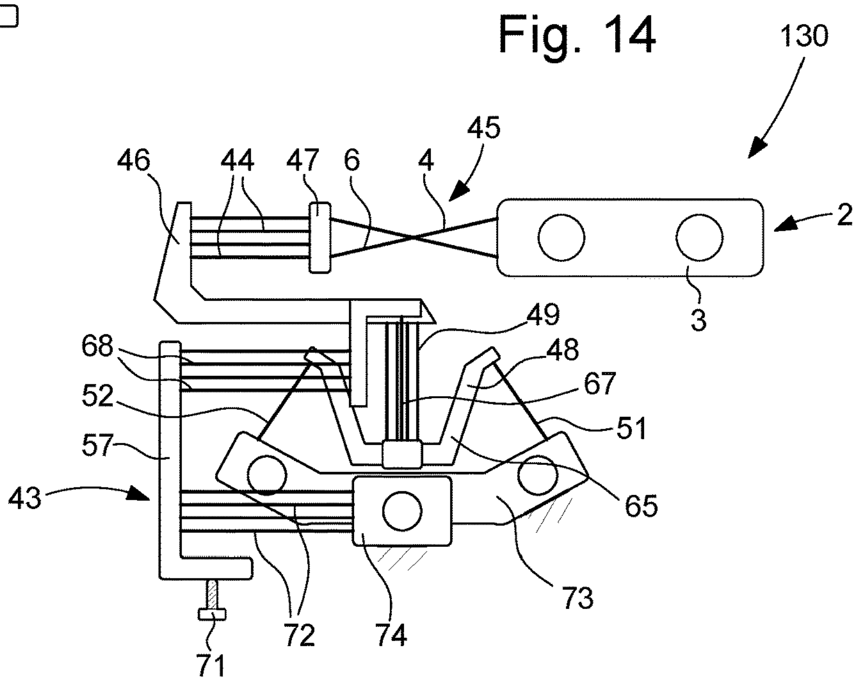

In the third variant of resonator mechanism 130 of the third embodiment, represented in FIG. 14, the pre-stressing means 43 include a stud 65 assembled on the base of the U of the fourth moveable body 48, a first L-shaped moveable body 66, and a tertiary flexible strip 67 connecting the stud 65 to the inner base of the L. The tertiary flexible strip 67 is preferably arranged above the septenary flexible strips 49. The pre-stressing means 43 further include a second L-shaped moveable body 69 and quaternary flexible strips 68, the quaternary flexible strips 68 connecting the outer side of the bar of the L of the first moveable body 66 to the inner side of the bar of the L of the second moveable body 69. The quaternary flexible strips 68 are preferably parallel.

The pre-stressing means 43 further include at least one quinary flexible strip 72, preferably four quinary flexible strips 72, connecting the inner side of the bar of the L of the second moveable body 69 to the fixed support 73. The quinary flexible strips 72 are preferably parallel. The fixed support 73 has an arc of circle shape at the ends of which the secondary flexible strips 51, 52 are joined. The fixed support 73 also comprises an additional central section 74 on which the quinary strips 72 are joined.

The pre-stressing means 43 also comprise a screw 71 arranged longitudinally to come into contact with the second moveable body 69 to apply a variable force or torque. By applying a variable force or torque on the second moveable body 69, the stiffness of the resonator mechanism 130 is varied.

The stud 65, the tertiary flexible strip 67, the first moveable body 66, the quaternary flexible strips 68, the second moveable body 69, the quinary flexible strips 72, the screw 71 and the additional central section 74, are arranged in an upper stage of the resonator mechanism 130, the stage being in a plane substantially parallel to the plane comprising the other portions of the mechanism 130.

Figure 15:
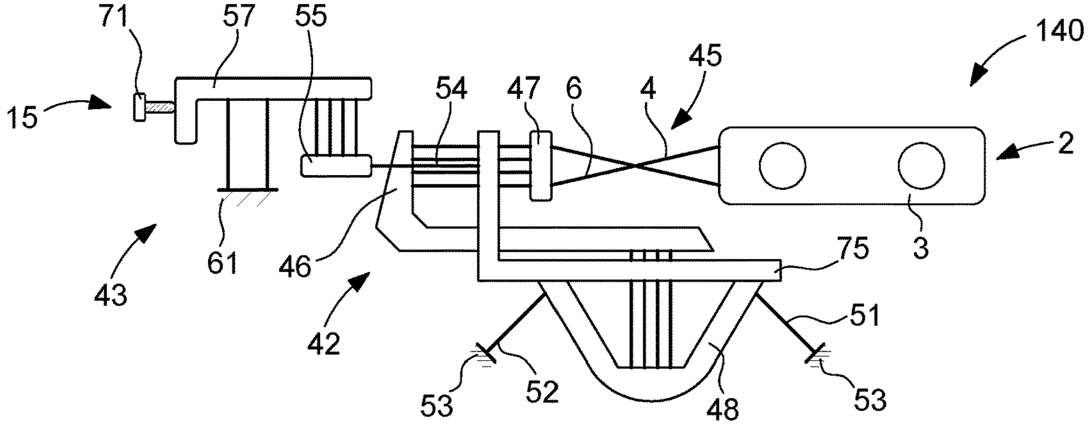

The fourth variant of resonator mechanism 140 of the third embodiment, represented in FIG. 15, is similar to the second variant, except for the intermediate body 75 which has an L-shape. The bar of the L is assembled on the fourth U-shaped moveable body 48, whereas the base of the L folds above the flexible element 42. The tertiary flexible strip 54 is connected to the free end of the base of the L on the outer side. Thus, the screw 58, the first moveable body 55 and the second moveable body 57, as well as the quaternary 56 and quinary 59 strips are arranged perpendicular in relation to their respective positions of the second variant of the second embodiment.

In the embodiments described, the flexible strips are preferably straight. Furthermore, the flexible strips of the same type are preferably of the same length. The flexible strips may be continuously flexible or only have flexible portions.

The invention also relates to a horological movement, not represented in the figures, the movement comprising a rotating resonator mechanism 10, 20, 30, 40, 50, 60, 70, 80, 90, 100, 110, 120, 130, 140 such as previously described.

Naturally, the invention is not limited to the embodiments described with reference to the figures and variants may be envisaged without departing from the scope of the invention.

The invention claimed is:

1. A rotating resonator mechanism for horology, comprising:

a flexible guide (5, 45) and an oscillating mass (2), the flexible guide (5, 45) comprising at least two main flexible strips (4, 6) and a rigid portion (7, 47), the main flexible strips (4, 6) being joined to the rigid portion (7, 47) of the flexible guide (5, 45) and to the oscillating mass (2); and adjustment means for adjusting the stiffness of the resonator mechanism, the adjustment means comprising a flexible element (12, 42) arranged in series of the flexible guide (5, 45), the flexible element (12, 42) being connected to the rigid portion (7, 47) of the flexible guide (5, 45) and to a fixed support (11, 53), so that the flexible guide (5, 45) is suspended by the flexible element (12, 42), wherein:

the flexible element (12, 42) forms a pivot to make it possible for the rigid portion (7, 47) to perform a rotating movement, the flexible guide (5, 45) and the flexible element (12, 42) extend substantially in a same plane to make it possible for the oscillating mass (2) to perform a rotating movement about a virtual pivot, the adjustment means further comprises pre-stressing means (15, 43) to apply a variable force or torque on the flexible element (12, 42) or the flexible guide (5, 45), to vary the stiffness of the flexible element (12, 42).

2. The resonator mechanism according to claim 1, wherein the pre-stressing means (15, 43) vary only the stiffness of the flexible element (12, 42) without modifying the stiffness of the main flexible strips (4, 6).

3. The resonator mechanism according to claim 1, wherein the pre-stressing means (15) comprise pins (14, 16) in contact with the secondary flexible strips (8, 9).

4. The resonator mechanism according to claim 1, wherein the pre-stressing means (15) apply the variable force or torque on the secondary flexible strips (8, 9).

5. The resonator mechanism according to claim 1, wherein the pre-stressing means (15) apply the variable force or torque on the rigid portion (7) of the flexible guide (5).

6. The resonator mechanism according to claim 5, wherein the pre-stressing means (15, 43) comprise a first moveable body (24, 55, 66) and at least one tertiary flexible strip (25, 54, 67) connected to the first moveable body (24, 55, 66) and to the rigid portion (7, 47) of the flexible guide (5, 45) or to the flexible element (42).

7. The resonator mechanism according to claim 6, wherein the pre-stressing means (15, 43) comprise a plurality of quaternary flexible strips (26, 56, 68) and a second moveable body (27, 57, 69), the quaternary flexible strips (26, 56) connecting the second moveable body (27, 37, 57, 69) to the first moveable body (24, 55, 66).

8. The resonator mechanism according to claim 7, wherein the pre-stressing means (15, 43) comprise at least one quinary flexible strip (28, 32, 59, 72) connecting the second moveable body (37, 69) or the first moveable body (24, 55) to a fixed support (31, 61, 73).

9. The resonator mechanism according to claim 7, wherein the pre-stressing means (15, 43) include a screw (29, 58, 71) longitudinally moveable against the second moveable body (27, 37, 57, 69).

10. The resonator mechanism according to claim 1, wherein the pre-stressing means (15, 43) include an eccentric screw (17) in contact with a second moveable body (27) or the rigid portion (7).

11. The resonator mechanism according to claim 1, wherein the pre-stressing means (15) comprise a spring (21) connected to the rigid portion (7) and a moveable body (23) for stretching or compressing the spring (21).

12. The resonator mechanism according to claim 1, wherein the pre-stressing means (15, 43) are arranged in the same plane as the flexible guide (5, 45) and the flexible element (12).

13. The resonator mechanism according to claim 1, wherein the pre-stressing means (43) are arranged in a plane substantially parallel to the plane of the flexible guide (45) and of the flexible element (12).

14. The resonator mechanism according to claim 1, wherein the flexible element (42) comprises a third moveable body (46), and a plurality of senary flexible strips (44) connecting the third moveable body (46) to the rigid portion (47).

15. The resonator mechanism according to claim 14, wherein the flexible element (42) comprises a fourth moveable body (48) and a plurality of septenary strips (49) connecting the third moveable body (46) to the fourth moveable body (48).

16. The resonator mechanism according to claim 15, wherein a tertiary flexible strip (54, 67) is connected to the fourth moveable body (48).

17. The resonator mechanism according to claim 1, wherein the two main strips (4, 6) of the flexible guide (5, 45) are crossed.

18. The resonator mechanism according to claim 1, wherein the flexible element (12, 42) has a stiffness greater than a stiffness of the flexible guide (5, 45).

19. A horological movement comprising a resonator mechanism, according to claim 1.

20. A rotating resonator mechanism for horology, comprising:

a flexible guide (5, 45) and an oscillating mass (2), the flexible guide (5, 45) comprising at least two main flexible strips (4, 6) and a rigid portion (7, 47), the main flexible strips (4, 6) being joined to the rigid portion (7, 47) of the flexible guide (5, 45) and to the oscillating mass (2); and adjustment means for adjusting the stiffness of the resonator mechanism, the adjustment means comprising a flexible element (12, 42) arranged in series of the flexible guide (5, 45), the flexible element (12, 42) being connected to the rigid portion (7, 47) of the flexible guide (5, 45) and to a fixed support (11, 53), so that the flexible guide (5, 45) is suspended by the flexible element (12, 42), wherein:

the flexible element (12, 42) forms a pivot to make it possible for the rigid portion (7, 47) to perform a rotating movement, the flexible guide (5, 45) and the flexible element (12, 42) extend substantially in a same plane to make it possible for the oscillating mass (2) to perform a rotating movement about a virtual pivot, the adjustment means further comprises pre-stressing means (15, 43) to apply a variable force or torque on the flexible element (12, 42) or the flexible guide (5, 45), to vary the stiffness of the flexible element (12, 42), and the pre-stressing means (15) comprise a first magnet (17) integral with the rigid portion (7) or with a second moveable body and a second magnet (18) moveable in relation to the first magnet (17).

* * * * *